(12) United States Patent
Li et al.

(10) Patent No.: US 12,536,143 B2
(45) Date of Patent: Jan. 27, 2026

(54) DATA ENCODING AND DECODING METHODS AND SYSTEMS

(71) Applicant: Alipay (Hangzhou) Information Technology Co., Ltd., Zhejiang (CN)

(72) Inventors: Mengyu Li, Hangzhou (CN); Chongmin Huang, Hangzhou (CN); Zigang Zhang, Hangzhou (CN); Kaihang Dai, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/526,581

(22) Filed: Dec. 1, 2023

(65) Prior Publication Data
US 2024/0193139 A1    Jun. 13, 2024

(30) Foreign Application Priority Data
Dec. 8, 2022   (CN) .......................... 202211579602.8

(51) Int. Cl.
*G06F 16/215* (2019.01)
*G06F 16/22* (2019.01)

(52) U.S. Cl.
CPC ........ *G06F 16/215* (2019.01); *G06F 16/2237* (2019.01); *G06F 16/2282* (2019.01)

(58) Field of Classification Search
CPC . G06F 16/215; G06F 16/2237; G06F 16/2282
See application file for complete search history.

(56) References Cited

U.S. PATENT DOCUMENTS

| | | | |
|---|---|---|---|
| 9,223,612 B1* | 12/2015 | Feldman | G06F 3/0652 |
| 2006/0212467 A1* | 9/2006 | Murthy | G06F 40/123 |
| 2014/0115013 A1* | 4/2014 | Anderson | G06F 16/215 |
| | | | 707/812 |
| 2014/0279961 A1* | 9/2014 | Schreter | G06F 3/0673 |
| | | | 707/693 |
| 2017/0115968 A1* | 4/2017 | Fukala | G06F 16/25 |
| 2017/0154057 A1* | 6/2017 | Wu | G06F 16/2228 |
| 2017/0177604 A1* | 6/2017 | Geissinger | G06F 8/4434 |
| 2019/0236049 A1* | 8/2019 | Vantrease | G06F 17/16 |
| 2020/0396563 A1* | 12/2020 | Tessier-Lessard | H04W 4/029 |

* cited by examiner

*Primary Examiner* — Tony Wu
(74) *Attorney, Agent, or Firm* — Fish & Richardson P.C.

(57) ABSTRACT

This specification disclose methods, apparatus, devices, and systems for encoding and decoding data. In one implementation, a method includes: obtaining instance data, and generating, based on ontology definition data, encoded data corresponding to the instance data. The encoded data comprise a data area storing valid fields of the instance data, and a description part. The description part is configured to describe a distribution of the valid field by using validity information of the fields when a quantity of the invalid fields is greater than or equal to a first threshold. The description part is configured to describe a distribution of the valid field by using at least one of size information or type information of the fields when the quantity of the plurality of invalid fields is smaller than the first threshold.

20 Claims, 13 Drawing Sheets

| Order number | Order time | Product name | Product amount |
|---|---|---|---|
| 0001 | 2022/01/22 09:00 | Schoolbag | 50 RMB |
| 0002 | 2022/03/05 10:00 | Table | 100 RMB |
| 0003 | 2022/10/01 20:00 | Table lamp | 60 RMB |

| Order number | Order time | Product name | Product amount |
|---|---|---|---|
| 0001 | 2022/01/22 09:00 | Schoolbag | 50 RMB |
| 0002 | 2022/03/05 10:00 | Table | 100 RMB |
| 0003 | 2022/10/01 20:00 | Table lamp | 60 RMB |

FIG. 1

| Size | Indication content |
|---|---|
| 0b0000 | 1 byte |
| 0b0001 | 2 bytes |
| 0b0010 | 4 bytes |
| 0b0011 | 8 bytes |
| ... | ... |
| 0b1110 | NULL |
| 0b1111 | 0 bytes |

FIG. 5

| Type | Indication content |
|---|---|
| 0b00 | Integer type |
| 0b01 | Float type |
| 0b10 | String type |
| 0b11 | Logically deleted field |

FIG. 6

[VER]=0b0000

ROW=[VER][CNT][SIZE_ARR][TYPE_ARR][DATA]

[VER]=0b0001

ROW=[VER][CNT][NULL_BIT_MAP][SIZE_ARR][TYPE_ARR][DATA]

[VER]=0b0010

ROW=[VER][CNT][DEL_BIT_MAP][SIZE_ARR][TYPE_ARR][DATA]

[VER]=0b0011

ROW=[VER][CNT][NULL_BIT_MAP][DEL_BIT_MAP][SIZE_ARR][TYPE_ARR][DATA]

FIG. 7

DATA ENCODING AND DECODING METHODS AND SYSTEMS

CROSS-REFERENCE TO RELATED APPLICATIONS

This application claims priority to Chinese Patent Application No. 202211579602.8, filed on Dec. 8, 2022, which is hereby incorporated by reference in its entirety.

TECHNICAL FIELD

This specification relates to the database field, and in particular to data encoding and decoding methods and systems.

BACKGROUND

In some situations, data need to be encoded before being written to a database. Correspondingly, after encoded data are read from the database, the encoded data need to be decoded to obtain data content. Improving storage efficiency of the database is one of important directions of database optimization, in other words, it is desirable to store same or even more content with less storage space.

Therefore, data encoding and decoding solutions need to be provided to improve storage efficiency of the database.

SUMMARY

Some embodiments of this specification provide an adaptive data encoding method. The method is performed by one or more processors, and includes the following: obtaining instance data; and encoding the instance data based on ontology definition data to obtain encoded data for storage. The ontology definition data are used to define one or more fields and data types of the fields. The encoded data include a description part and a data area. A quantity of elements in the data area is related to a quantity of valid fields, the element is a value of a corresponding valid field, and the value is obtained from the instance data. Invalid fields include a null-value field and/or a logically deleted field in the ontology definition data. When the invalid fields are sufficient to satisfy a first specified condition, the description part describes a distribution of the valid fields in the one or more fields by using validity information of the one or more fields, and describes locations of values of the valid fields in the data area by using size information and/or type information of the valid fields; otherwise, the description part describes a distribution of the valid fields in the one or more fields and locations of values of the valid fields in the data area by using size information and/or type information of the one or more fields.

Some embodiments of this specification provide a data encoding system, including an acquisition module, configured to obtain instance data; and an encoding module, configured to encode the instance data based on ontology definition data to obtain encoded data for storage. The ontology definition data are used to define one or more fields and data types of the fields. The encoded data include a description part and a data area. A quantity of elements in the data area is related to a quantity of valid fields, the element is a value of a corresponding valid field, and the value is obtained from the instance data. Invalid fields include a null-value field and/or a logically deleted field in the ontology definition data. When the invalid fields are sufficient to satisfy a first specified condition, the description part describes a distribution of the valid fields in the one or more fields by using validity information of the one or more fields, and describes locations of values of the valid fields in the data area by using size information and/or type information of the valid fields; otherwise, the description part describes a distribution of the valid fields in the one or more fields and locations of values of the valid fields in the data area by using size information and/or type information of the one or more fields.

Some embodiments of this specification provide a data encoding method. The method is performed by one or more processors, and includes the following: obtaining instance data; and encoding the instance data based on ontology definition data to obtain encoded data for storage. The ontology definition data are used to define one or more fields and data types of the fields. The encoded data include a size list, where elements in the size list are in a one-to-one correspondence with the one or more fields, and the element indicates a storage space size of a value of a corresponding field in a data area; a type list, where elements in the type list are in a one-to-one correspondence with the one or more fields, and the element indicates a data type of a corresponding field; and the data area, where a quantity of elements in the data area is related to a quantity of valid fields, the element is a value of a corresponding valid field, and the value is obtained from the instance data. Invalid fields include a null-value field and/or a logically deleted field in the ontology definition data.

Some embodiments of this specification provide a data encoding method. The method is performed by one or more processors, and includes the following: obtaining instance data; and encoding the instance data based on ontology definition data to obtain encoded data for storage. The ontology definition data are used to define one or more fields and data types of the fields. The encoded data include a bitmap, where elements in the bitmap are in a one-to-one correspondence with the one or more fields, and the element is used to indicate whether a corresponding field is valid; a size list, where the size list includes elements corresponding to valid fields, and the element is used to indicate a storage space size of a value of a corresponding field in a data area; a type list, where the type list includes elements corresponding to the valid fields, and the element indicates a data type of a corresponding field; and the data area, where a quantity of elements in the data area is related to a quantity of valid fields, the element is a value of a corresponding valid field, and the value is obtained from the instance data. Invalid fields include a null-value field and/or a logically deleted field in the ontology definition data.

Some embodiments of this specification provide a data encoding apparatus. The apparatus includes a processor and a storage device, and the storage device is configured to store instructions. When the processor executes the instructions, the data encoding method described in any one of the embodiments of this specification is implemented.

Some embodiments of this specification provide a data decoding method. The method is performed by one or more processors, and includes the following: reading encoded data from a storage area, where the encoded data are obtained based on the data encoding method described in any one of the embodiments of this specification; and decoding the encoded data based on ontology definition data. The decoding further includes the following: obtaining a value of a corresponding field from a data area based on a description part of the encoded data; and writing the value to a storage unit, where a storage space size of the storage unit is determined based on a data type of the field in the ontology definition data.

Some embodiments of this specification provide a data decoding system, including a reading module, configured to read encoded data from a storage area, where the encoded data are obtained based on the data encoding method described in any one of the embodiments of this specification; and a decoding module, configured to decode the encoded data based on ontology definition data. The decoding module is further configured to obtain a value of a field from a data area based on a description part of the encoded data; and write the value to a storage unit, where a storage space size of the storage unit is determined based on a data type of the field in the ontology definition data.

Some embodiments of this specification provide a data decoding apparatus. The apparatus includes a processor and a storage device, and the storage device is configured to store instructions. When the processor executes the instructions, the data decoding method described in any one of the embodiments of this specification is implemented.

Some embodiments of this specification provide an encoded data updating method. The method is performed by one or more processors, and includes the following: generating new ontology definition data when logically deleted fields in ontology definition data are sufficient to satisfy a fourth specified condition, where the ontology definition data are used to define one or more fields and data types of the fields, and the new ontology definition data are obtained by removing the logically deleted fields from the old ontology definition data; and for stored encoded data, decoding the encoded data based on the old ontology definition data to obtain decoded data, and encoding the decoded data based on the new ontology definition data based on the above-mentioned adaptive data encoding method, to obtain new encoded data and store the new encoded data. The stored encoded data are obtained by encoding instance data based on the old ontology definition data according to the above-mentioned adaptive data encoding method.

Some embodiments of this specification provide an encoded data updating system, including a generation module and a re-encoding module. The generation module is configured to generate new ontology definition data when logically deleted fields in ontology definition data are sufficient to satisfy a fourth specified condition. The ontology definition data are used to define one or more fields and data types of the fields, and the new ontology definition data are obtained by removing the logically deleted fields from the old ontology definition data. The re-encoding module is configured to: for stored encoded data, decode the encoded data based on the old ontology definition data to obtain decoded data, and encode the decoded data based on the new ontology definition data based on the above-mentioned adaptive data encoding method, to obtain new encoded data and store the new encoded data. The stored encoded data are obtained by encoding instance data based on the old ontology definition data according to the above-mentioned adaptive data encoding method.

Some embodiments of this specification provide an encoded data updating apparatus, including a processor and a storage device. The storage device is configured to store instructions, and when the processor executes the instructions, the encoded data updating method described in any one of the embodiments of this specification is implemented.

Some embodiments of this specification provide an encoded data updating method. The method is performed by a database cluster. The database cluster includes a central server and a plurality of data servers, and the plurality of data servers respectively store copies of same encoded data. The method includes the following: generating new ontology definition data by using the central server when logically deleted fields in ontology definition data are sufficient to satisfy a fourth specified condition, where the ontology definition data are used to define one or more fields and data types of the fields, and the new ontology definition data are obtained by removing the logically deleted fields from the old ontology definition data; and performing update processing on encoded data in the local copies of the plurality of data servers in batches by using the plurality of data servers, where the encoded data in the local copies are obtained by encoding instance data based on the old ontology definition data according to the above-mentioned adaptive data encoding method. The update processing includes the following: decoding the encoded data based on the old ontology definition data to obtain decoded data, and encoding the decoded data based on the new ontology definition data according to the above-mentioned adaptive data encoding method, to obtain new encoded data and store the new encoded data. The method further includes the following: deleting the old ontology definition data after the data servers update the encoded data based on the new ontology definition data.

BRIEF DESCRIPTION OF DRAWINGS

This specification will be further illustrated by way of example embodiments that will be described in detail with reference to the accompanying drawings. These embodiments are not limiting. In these embodiments, the same reference numeral represents the same structure.

FIG. 1 is a schematic diagram illustrating a data table;

FIG. 5 illustrates example indication content of SIZE with different values;

FIG. 6 illustrates example indication content of TYPE with different values;

FIG. 7 is a schematic diagram illustrating composition of encoded data, according to some embodiments of this specification;

DESCRIPTION OF EMBODIMENTS

Figure 2:
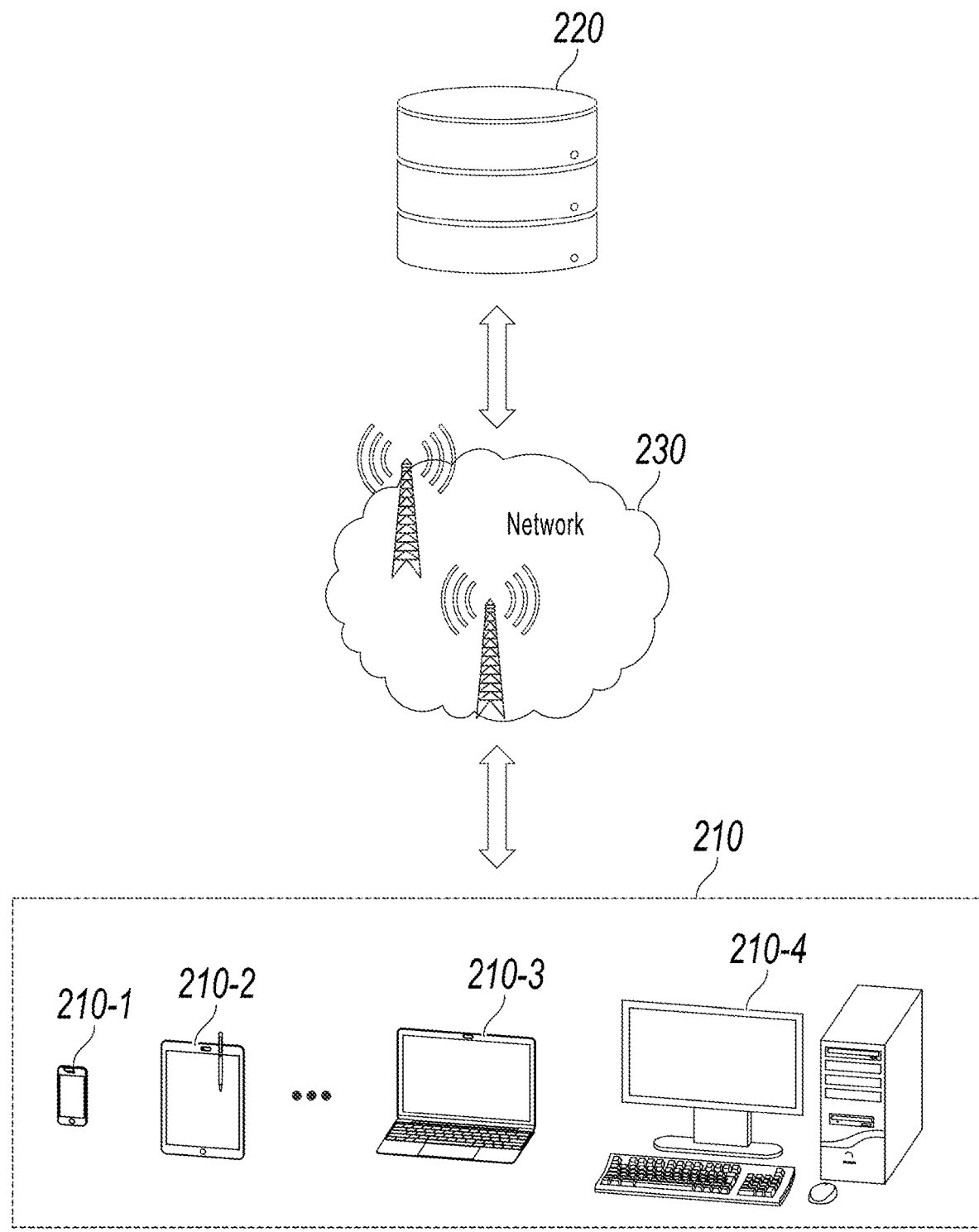
FIG. 2 is a schematic diagram illustrating an application scenario of a data service system, according to some embodiments of this specification.

To describe the technical solutions in embodiments of this specification more clearly, the following briefly describes the accompanying drawings needed for describing the embodiments. Clearly, the accompanying drawings in the following description are merely some examples or embodiments of this specification. A person of ordinary skill in the art can still apply this specification to other similar scenarios based on these accompanying drawings without creative efforts. Unless clear from the language environment or otherwise stated, the same reference numeral in the figures represents the same structure or operation.

It should be understood that the terms "system", "apparatus", "unit", and/or "module" used here are intended to distinguish between different components, elements, parts, portions, or assemblies of different levels. However, if other terms can achieve the same purpose, the term can be replaced by other expressions.

As shown in this specification, the terms "one", "a", and/or "the", etc. may not be in a singular form, and can be in a plural form unless the context expressly suggests exceptions. Generally, the terms "include" and "contain" indicate only steps and elements that have been explicitly identified, these steps and elements do not constitute an exclusive listing, and the method or device may also include other steps or elements.

A flowchart is used in this specification to describe operations performed by a system according to the embodiments of this specification. It should be understood that the operations may not be accurately performed in sequence. Instead, the steps can be processed in reverse order or simultaneously. In addition, other operations can be added to these processes, or one or more operations can be removed from these processes.

First, related terms of a database are described.

The database is a valid form of storing and maintaining computer data. The database usually uses a two-dimensional table (referred to as a data table below) to store data. Each data table is composed of rows and columns. Generally, each row of the data table is used to store one piece of instance data (also referred to as a record), and each column of the data table is used to record one constituent field of the instance data.

FIG. 1 is a schematic diagram illustrating a data table. As shown in FIG. 1, each row of the order data table is used to store one piece of order data. Each piece of order data includes four fields: an order number, order time, a product name, and a product amount. Correspondingly, there are four columns in the data table, and each column is used to record one field of order data.

The data table can have ontology definition data (also referred to as a schema), used to define constituent fields of instance data in the data table and data types of the constituent fields. The field can be defined by way of naming (numbering) the field, describing a function of the field, etc. Definition/classification of data types is not limited in this specification.

In some embodiments, the ontology definition information of the data table can include one or more of a table name (for example, an order data table) of the data table, column names (for example, field names such as an order number and order time) of the columns, data types (for example, the data types of the fields) of the columns, statuses (for example, whether the field is logically deleted, or whether the column is a null-value column) of the columns, a primary key, etc. The primary key refers to a field that can be used to uniquely identify one piece of instance data. For example, the order data table can use the order number as the primary key.

The instance data in the data table can be stored in a form of encoded data (referred to as a code). Correspondingly, after reading a code of one piece of instance data, a processor can decode the code, to parse out a value of any field in the instance data.

A value of an invalid field is still retained in encoded data in a conventional encoding method, and storage efficiency of a database needs to be improved. In view of the above, some embodiments of this specification provide some new encoding methods, which can effectively improve storage efficiency of the database.

FIG. 2 is a schematic diagram illustrating an application scenario of a data service system, according to some embodiments of this specification. As shown in FIG. 2, a system 200 can include a client 210, a database system 220, and a network 230.

A user can send a request to the database system 220 by using the client 210.

In some embodiments, the user can send a data table creation request to the database system 220 by using the client 210, to create a data table. Creating a data table can refer to generating ontology definition data of the data table. The data table creation request can include a table name (for example, an order data table) of a data table to be created, column names (for example, an order number, order time, a product name, and a product amount) of columns, data types of the columns, and a primary key (for example, the order number), to indicate to generate ontology definition data that include the information.

In some embodiments, the user can send a data table deletion request to the database system 220 by using the client 210, to delete a data table. Deleting a data table can refer to deleting ontology definition data of the data table. The data table deletion request can include a table name of a data table to be deleted.

In some embodiments, the user can send a table structure update request to the database system 220 by using the client 210, to update a data table. Updating a data table can refer to modifying ontology definition data of the data table. Specifically, the table structure update request can include one or more of a table name (for example, an order data table) of a data table to be updated, a column name (for example, a product quantity) of an inserted (added) column and a data type, a column name (for example, a product amount) of a deleted column, etc.

In some embodiments, the user can send a data insertion request to the database system 220 by using the client 210, to insert instance data into a data table. Specifically, the data insertion request can include instance data to be inserted (added) and a table name (for example, an order data table) of a data table that the instance data are to be inserted.

In some embodiments, the user can send a data deletion request to the database system 220 by using the client 210, to delete instance data in a data table. Specifically, the data deletion request can include a value (for example, order number 0001) of a primary key of instance data to be deleted and a table name (for example, an order data table) of a data table where the instance data are located.

It is worthwhile to note that in this specification, unless there is a specific context or special descriptions, the term "deletion" should preferentially be understood as logical deletion (for example, mark deletion) instead of physical deletion. For logically deleted data, although the data still exist physically, a database can refuse to provide the data as a query result, for example, remind the user that data that the user queries for have been deleted.

In some embodiments, the user can send a data update request to the database system 220 by using the client 210, to update instance data in the database, for example, modify values of at least a portion of fields in a certain piece of instance data. Specifically, the data update request can include a value (for example, a modified product amount) of a field to be modified (a modified field) of the instance data, a table name (for example, an order data table) of a data table where the instance data are located, and a value (for example, order number 0001) of a primary key of the instance data.

In some embodiments, the user can send a data query request to the database system 220 by using the client 210, to query instance data in a database. The user can query for values of all fields in a piece of instance data, or can query for a value of a specified field in a piece of instance data. Specifically, the query request can include a value (for example, order number 0001) of a primary key of the instance data to be queried, a field name (for example, an order amount) of a field to be queried, and a table name (for example, an order data table) of a data table where the instance data are located.

Data insertion, data deletion, and data update can be collectively referred to as write operations, and correspondingly, the data insertion request, the data deletion request, and the data update request can be collectively referred to as write requests. The data query is a read operation, and correspondingly, the data query request is a read request. It is worthwhile to note that the read/write operation can be triggered by a read/write request from the client 210, or can be spontaneously performed by the database system 200 (for example, updating encoded data).

In some embodiments, the user terminal 210 can include a smartphone 210-1, a tablet computer 210-2, a laptop computer 210-3, a desktop computer 210-4, etc., or any combination thereof.

The database system 220 can process a request from the client 210.

In some embodiments, the database system 220 can generate and store ontology definition data of a data table in response to a data table creation request from the client 210.

In some embodiments, the database system 220 can delete ontology definition data of a data table in response to a data table deletion request from the client 210.

In some embodiments, the database system 220 can modify ontology definition data of a data table in response to a table structure update request from the client 210.

In some embodiments, in response to a write request from the client 210, the database system 220 can obtain instance data, encode the instance data based on ontology definition data, and store obtained encoded data.

In some embodiments, in response to a data query request (namely, a read request) from the client 210, the database system 220 can read encoded data from a storage area, and decode the encoded data based on ontology definition data, to obtain a data query result.

Figure 4:
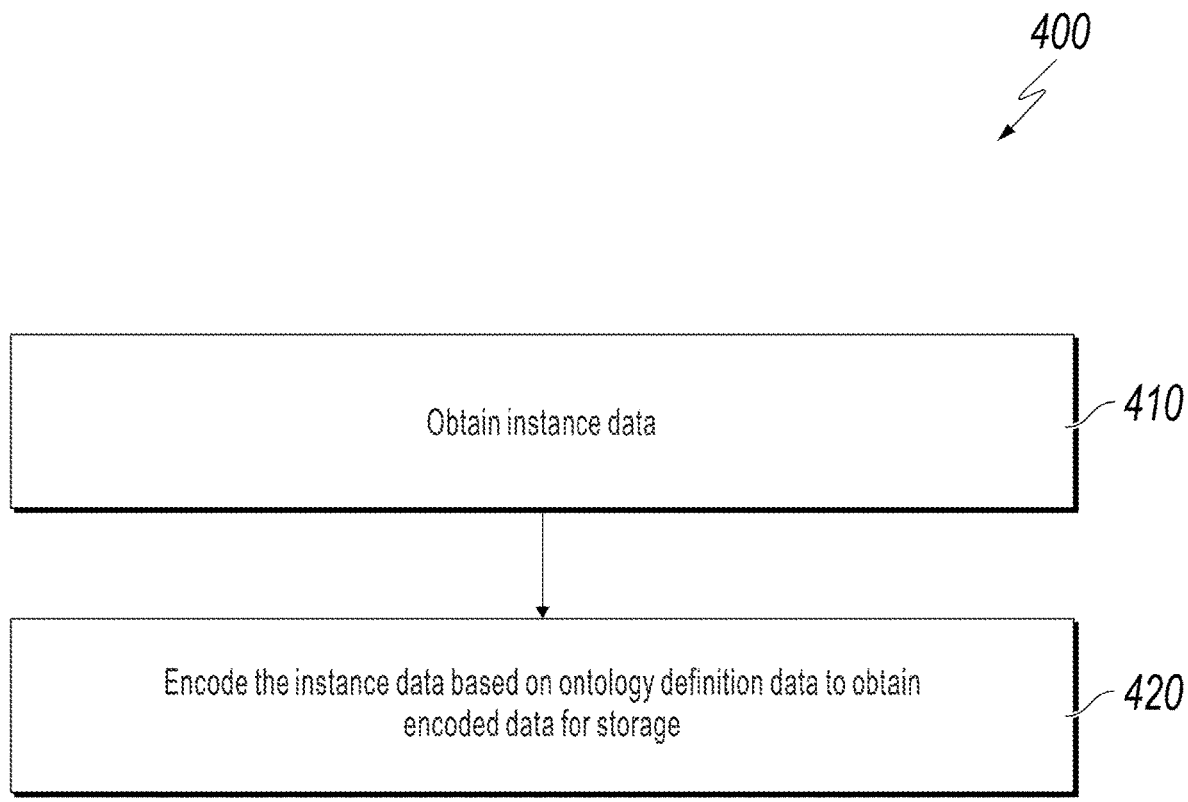
FIG. 4 is an example flowchart illustrating a data encoding method, according to some embodiments of this specification.

For more details about encoding and decoding, references can be made to FIG. 4 and related descriptions thereof.

In some embodiments, the database system 220 can be a centralized database system. For example, the database system 220 can be implemented on a single server.

In some embodiments, the database system 220 can be a distributed database system. For example, the database system 220 can be implemented on a server cluster. A plurality of copies of data are stored on a plurality of machine nodes in a distributed way, for example, are stored on machine nodes in different geographic locations (for example, different cities). Advantages of the distributed database system include but are not limited to the following: (1) Reliability and availability of the system are improved. When a certain node is faulty, the system can perform an operation on a same copy on another node. A single-point fault does not cause a breakdown of the whole system. (2) System performance is improved. The client can select a nearest database copy to access the system based on a distance, so that communication costs are reduced, and overall system performance is improved.

It is worthwhile to note that database copies stored by different nodes can be all the same, or can be at least partially the same. This is not specifically limited in this specification.

The network 230 connects components of the system 200, so that communication can be performed between the components. The network between the components of the system can include a wired network and/or a wireless network. For example, the network 230 can include a cable network, a wired network, an optical fiber network, a telecommunication network, an internal network, the Internet, a local area network (LAN), a wide area network (WAN), a wireless local area network (WLAN), a metropolitan area network (MAN), a public switched telephone network (PSTN), a Bluetooth network, a ZigBee network, near field communication (NFC), an intra-device bus, an intra-device line, a cable connection, etc., or any combination thereof. A network connection between every two components can be in one of the above-mentioned forms or in a plurality of forms.

Figure 3:
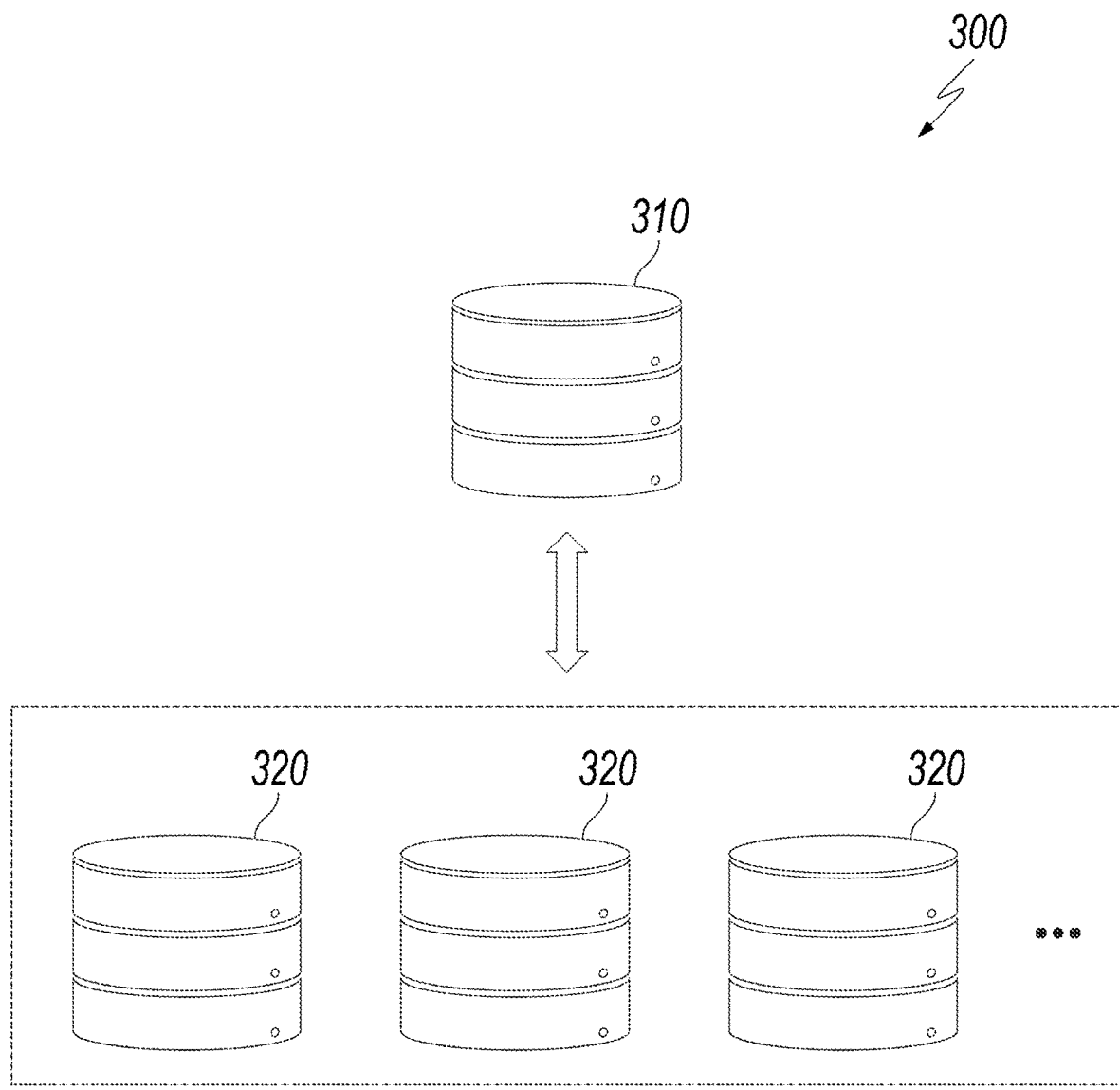
FIG. 3 is a schematic diagram illustrating composition of a distributed database system, according to some embodiments of this specification.

FIG. 3 is a schematic diagram illustrating composition of a distributed database system, according to some embodiments of this specification. The distributed database system can be implemented on a server cluster 300.

As shown in FIG. 3, the server cluster 300 can include a central server 310 and a plurality of data servers 320. Referring to the above-mentioned content, the plurality of data servers 320 can respectively store copies of same encoded data.

The central server 310 is responsible for managing global ontology definition data (referred to as a schema set below). A request related to the ontology definition data (schema) can be forwarded by the data server to the central server. In some embodiments, the database system 220 can forward the data table creation request from the client 210 to the central server 310, and the central server 310 can generate a schema, and add the schema to the schema set in response to the request. In some embodiments, the database system 220 can forward the data table deletion request from the client 210 to the central server 310, and the central server 310 can delete a schema from the schema set in response to the request. In some embodiments, the database system 220 can forward the table structure update request from the client 210 to the central server 310, and the central server 310 can modify a schema in the schema set in response to the request.

The data server 320 is responsible for processing data requests such as a read request and a write request from a client (for example, the client 210). Details about data request processing can be found elsewhere in this specification.

The data server 320 can obtain a schema of a latest version from the central server periodically or occasionally, and re-encode instance data based on the schema of the latest version. For more details about re-encoding, references can be made to FIG. 9 and FIG. 10 and related descriptions thereof.

FIG. 4 is an example flowchart illustrating a data encoding method, according to some embodiments of this specification. A process 400 can be performed by one or more processors (for example, one or more processors of the database system 220 shown in FIG. 2). Specifically, the process 400 can be performed by a data encoding system 1100, shown in FIG. 11, implemented in the database system 220. As shown in FIG. 4, the process 400 can include the following steps.

Step 410: Obtain instance data. In some embodiments, step 410 can be performed by an acquisition module 1110.

Referring to the above-mentioned content, encoding can be bound to a write operation. Correspondingly, the instance data in step 410 can be instance data that the write operation is relating to.

In some embodiments, when a user needs to insert (add) a piece of instance data into a data table, the user can initiate a data insertion request to the database system 220 by using a client 210. The data insertion request can include the instance data. Correspondingly, the acquisition module 1110 can obtain the instance data to be inserted from the data insertion request.

Figure 8:
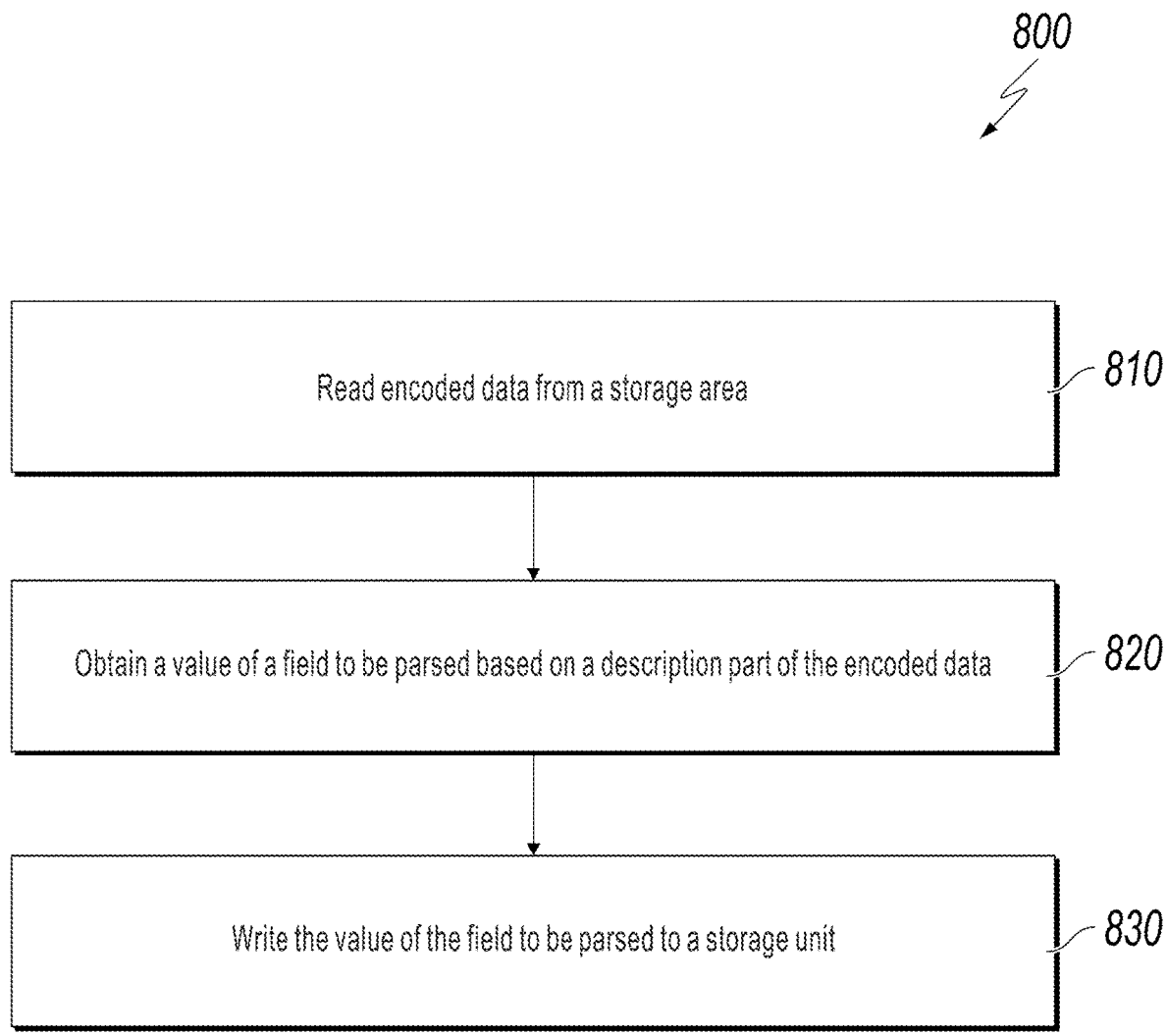
FIG. 8 is an example flowchart illustrating a data decoding method, according to some embodiments of this specification.

In some embodiments, when a user wants to update a piece of instance data in a data table, the user can initiate a data update request to the database system 220 by using a client 210. The data update request can include a value of a field to be modified (a modified field) of the instance data. Correspondingly, the acquisition module 1110 can obtain modified instance data based on the data insertion request and the instance data existing before modification. For a method for obtaining the instance data before modification, references can be made to content related to decoding in this specification (as shown in FIG. 8 and related descriptions thereof).

Figure 9:
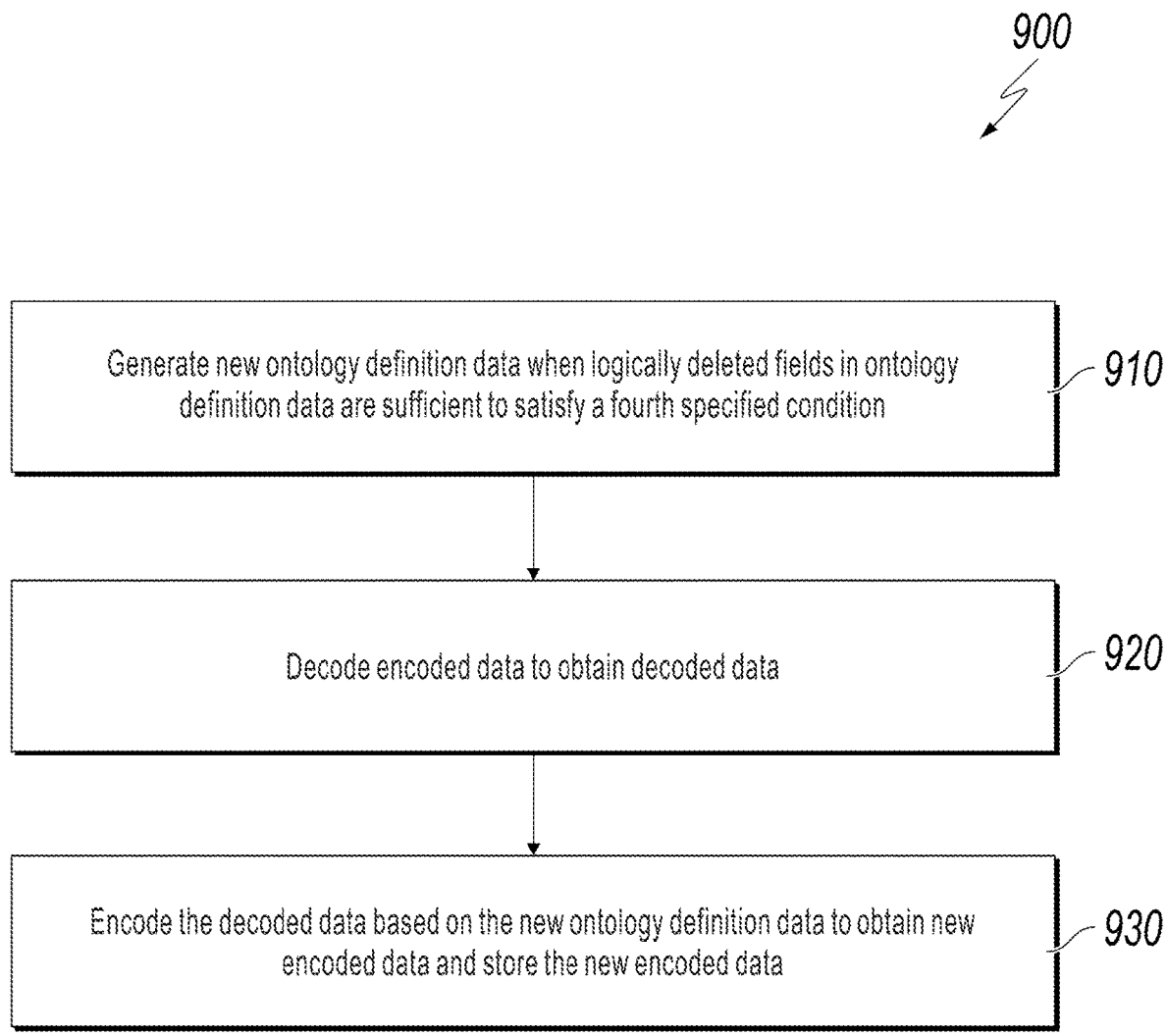
FIG. 9 is an example flowchart illustrating an encoded data updating method, according to some embodiments of this specification.

In some embodiments, the instance data in step 410 can be obtained through decoding, for example, through decoding before re-encoding (for more details, references can be made to FIG. 9 and related descriptions thereof).

Step 420: Encode the instance data based on ontology definition data to obtain encoded data for storage. In some embodiments, step 410 can be performed by an encoding module 1120.

The ontology definition data are used to define one or more fields and data types of the fields. The one or more fields are all fields constituting the instance data. For example, ontology definition data of the order data table shown in FIG. 1 can include field names and data types of four fields constituting the order data.

The following describes a format (also referred to as an encoding method) of the encoded data in detail.

The encoded data can include a description part and a data area. The description part and the data area can be adjacent to each other. It can be understood that "adjacent" means that the description part and the data area are consecutively stored in a storage area. It can be understood that a code of data can refer to encoded data obtained by encoding the data.

The data area (which can be denoted as [DATA]) is only used to store a value of a valid field. Invalid fields relative to the valid field can include a null-value (usually denoted as null) field and/or a logically deleted field. The ontology definition data (schema) can record whether each field is an invalid field. For example, the ontology definition data can indicate whether any field is a null-value field and/or indicate whether any field is a logically deleted field. In some embodiments, values of fields in the data area can be consecutively stored, so that a location of a field in the data area can be determined by using size information of the corresponding field.

The encoding and decoding methods provided in this specification provide support for a null value, and the null value can represent an unknown value. A null-value field (column) can be used as a reserved field (column). Taking a null-value column of an integer type (usually denoted as int) as an example, when the user needs to insert (add) a column of known values (for example, product quantities) of the integer type into a data table, the user can directly replace null values in the null-value column with the known values, without first updating ontology definition data (defining a new added column and a data type thereof) of the data table.

In some embodiments, when a value of a certain field that is neither logically deleted nor defined as a null value in ontology definition data is missing from instance data inserted by the user, the missing value of the field can also be marked as a null value. In this case, the field in the instance data can also be considered as an invalid field. For example, if the user needs to insert instance data "0004 . . . file bag 12 RMB" into an order data table, where order time is unknown, a value of the "order time" field in the record including "0004" can be set to a null value.

The description part is used to describe attributes of fields, for example, a quantity of fields, a data size (for example, a quantity of bytes), a data type (for example, the integer type, a float type, or a string type), and validity (whether the field is a logically deleted field or whether the field is a null-value field).

It is worthwhile to note that information (for example, data size information, data type information, and validity information) used to describe attributes of fields can be organized in any form. For illustrative purposes, the information is mainly described in a form of a table (for example, a size list, a type list, and a bitmap) in this specification.

For valid fields, the description part can describe locations of the valid fields in the data area by using the size list (which can be denoted as [SIZE_ARR]) to read values of the valid fields from the data area. Elements (which can be denoted as SIZE) in the size list can be in a one-to-one correspondence with the fields in the instance data, and the element is used to indicate a size of storage space occupied by a value of a corresponding field in the data area. Data sizes (for example, quantities of bits) of SIZE in [SIZE_ARR] can be equal, so that SIZE in [SIZE_ARR] can be read one by one based on the fixed data size (for example, 4 bits). In practice, to be compatible with a plurality of (for example, at least three) data sizes, SIZE usually occupies at least 2 bits.

Taking FIG. 1 as an example, in a code of order data, [SIZE_ARR] can include four SIZE in a one-to-one correspondence with four fields of the order data, and each SIZE can indicate a quantity of bytes occupied by a value of a corresponding field in the data area. Assuming that each SIZE occupies 4 bits, [SIZE_ARR]=0100100011111001, and a sequence of SIZE is consistent with a sequence of fields in an order data table, [SIZE_ARR] can indicate that an order number occupies 4 (0100) bytes, order time occupies 8 (1000) bytes, a product name occupies 15 (1111) bytes, and a product amount occupies 9 (1001) bytes.

Actually, a data size (for example, a quantity of bytes) indicated by an element (SIZE) in the size list does not necessarily have to be equal to a value of the element (SIZE), and it is feasible that the two satisfy a mapping (conversion) relationship. By way of example only, as shown in FIG. 5, when SIZE=0b0000 (0b represents "binary"), it indicates that a value of a corresponding field occupies 1 byte in the data area; when SIZE=0b0001, it indicates that a value of a corresponding field occupies 2 bytes in the data area; when SIZE=0b0010, it indicates that a value of a corresponding field occupies 4 bytes in the data area; when SIZE=0b0011, it indicates that a value of a corresponding field occupies 8 bytes in the data area; . . . ; and when SIZE=0b1111, it indicates that a value of a corresponding field occupies 0 bytes in the data area.

For valid fields, the description part can describe data types of the valid fields by using the type list (which can be denoted as [TYPE_ARR]). Elements (which can be denoted as TYPE) in the type list can be in a one-to-one correspondence with the fields in the instance data, and each element can indicate a data type of a corresponding field. Data sizes (for example, quantities of bits) of TYPE in [TYPE_ARR] can be equal, so that the elements in the type list can be read one by one based on the fixed data size (for example, 2 bits). In practice, to be compatible with a plurality of (for example, at least three) data types, TYPE usually occupies at least 2 bits.

In some embodiments, the data type described by using the type list can be a specific data type (which can be considered as a small type). In some embodiments, the data type described by using the type list can be a summary data type (which can be considered as a large type), and by way of example only, data types can be summarized into three types: an integer type (specifically including small types such as int8, int32, and int64), a float number type (referred to as a float type, specifically including small types such as float and double), and a string type (specifically including small types such as string, varchar, date, and datetime).

By way of example only, as shown in FIG. 6, when TYPE=0b00, it indicates that a corresponding field is of the integer type; when TYPE=0b01, it indicates that a corresponding field is of the float type; and when TYPE=0b10, it indicates that a corresponding field is of the string type.

In some embodiments, the data type can also reflect a data size or a storage space size of a value. For example, storage space occupied by a value whose data type is int8 is 1 byte, and storage space occupied by a value whose data type is float is 4 bytes. Therefore, in some embodiments, a location of a field in the data area can also be determined only by using type information of the corresponding field.

The data area being only used to store a value of a valid field can greatly improve storage efficiency of a database. However, a problem that needs to be further considered is how to mark an invalid field, so that a value of any field (regardless of whether the field is valid or not) can be correctly parsed. Embodiments of this specification provide two encoding ideas for marking an invalid field: Idea 1: The description part can describe a distribution of invalid fields in all fields by using a bitmap (which can be denoted as [BIT_MAP]), where elements (which can be denoted as BIT) in the bitmap are in a one-to-one correspondence with all the fields in the ontology definition data, and the element indicates whether a corresponding field is an invalid field (therefore, each element only needs to occupy 1 bit). Idea 2: The description part can describe a distribution of invalid fields by using a size list and/or a type list. In other words, the size list and/or the type list are or is not limited to describing a data size and/or a data type of a valid field. In this case, elements in the size list or the type list are in a one-to-one correspondence with all the fields in the ontology definition data, and the element indicates a size of storage space occupied by a value of a corresponding field in the data area or indicates a data type of a corresponding field. Further, in the size list, an element corresponding to a null-value field (if existent) is a predetermined value. For example, when SIZE=0b1110, it indicates that a corresponding field is a null-value field. In the type list, an element corresponding to a logically deleted field (if existent) is a predetermined value. For example, when TYPE=0b11, it indicates that a corresponding field is a logically deleted field. To further improve storage efficiency of the database, during encoding, an encoding idea can be selected based on a quantity of invalid columns. In general, idea 1 is more likely to be chosen if there are a larger quantity of invalid columns (for example, a proportion of invalid columns is higher), and idea 2 is more likely to be chosen if there are a smaller quantity of invalid columns (for example, a proportion of invalid columns is lower).

Based on a definition of the invalid field, there can be three cases for marking the invalid field. The following discusses the above-mentioned two encoding ideas in each case.

Case 1 (Invalid Fields Include only a Null-Value Field)

When null-value fields are sufficient to satisfy a first specified condition, the description part can describe a distribution of the null-value fields in all the fields by using a null-value field bitmap (which can be denoted as [NULL_BIT_MAP]); otherwise, the description part can describe a distribution of null-value fields by using a size list and/or a type list.

Elements (which can be denoted as NULL_BIT) in the null-value field bitmap can be in a one-to-one correspondence with all the fields, and the element indicates whether a corresponding field is a null-value field. For example, when NULL_BIT=1, it indicates that a corresponding field is a null-value field, and when NULL_BIT=0, it indicates that a corresponding field is not a null-value field. The first specified condition can include that a proportion of null-value fields in all the fields reaches a first proportion threshold, for example, 30% or 50%.

When null-value fields are insufficient to satisfy a first specified condition, elements (SIZE and/or TYPE) in the size list and/or the type list can be in a one-to-one correspondence with all the fields. An element corresponding to a null-value field (if existent) is a predetermined value. For example, referring to FIG. 5, when SIZE=0b1110, it indicates that a corresponding field is a null-value field. For another example, referring to FIG. 5 and FIG. 6, when SIZE=0b1110 and TYPE≠0b11, it indicates that a corresponding field is a null-value field.

By way of example only, assume that SIZE occupies 2 bits, and TYPE also occupies 2 bits. When 99 null-value fields exist in 100 fields, if a null-value field bitmap is used to describe a distribution of the null-value fields in all the fields, only 100*1 bits need to be consumed; or if a size list and/or a type list are or is used to describe a distribution of the null-value fields, 99*2 bits or 99*4 bits need to be consumed. When only one null-value field exists in 100 fields, if a size list and/or a type list are or is used to describe a distribution of the null-value field, only 1*2 bits or 1*4 bits need to be consumed; or if a null-value field bitmap is used to describe a distribution of the null-value field in all the fields, 100*1 bits need to be consumed. It can be seen from these two examples that when a proportion of null-value fields is too high, it is better to describe a distribution of the null-value fields by using a null-value field bitmap; otherwise, it is better to describe a distribution of the null-value fields by using a size list and/or a type list.

Case 2 (Invalid Fields Include only a Logically Deleted Field)

When logically deleted fields are sufficient to satisfy a first specified condition (which can be different from or the same as the first specified condition in case 1), the description part can describe a distribution of the logically deleted fields in all the fields by using a deleted field bitmap (which can be denoted as [DEL_BIT_MAP]); otherwise, the description part can describe a distribution of the logically deleted fields by using a size list and/or a type list.

Elements (which can be denoted as DEL_BIT) in the deleted field bitmap can be in a one-to-one correspondence with all the fields in the ontology definition data, and the element indicates whether a corresponding field is a logically deleted field. For example, when DEL_BIT=1, it indicates that a corresponding field is a logically deleted field, and when DEL_BIT=0, it indicates that a corresponding field is not a logically deleted field. The second specified condition can include that a proportion of logically deleted fields in all the fields reaches a first proportion threshold, for example, 20% or 50%.

When logically deleted fields are insufficient to satisfy a first specified condition, elements (SIZE and/or TYPE) in the size list and/or the type list can be in a one-to-one correspondence with all the fields. An element corresponding to a logically deleted field (if existent) is a predetermined value. For example, referring to FIG. 6, when TYPE=0b11, it indicates that a corresponding field is a logically deleted field. For another example, referring to FIG. 5 and FIG. 6, when SIZE=0b1111 and TYPE=0b11, it indicates that a corresponding field is a logically deleted field.

By way of example only, assume that SIZE occupies 2 bits, and TYPE also occupies 2 bits. When 99 logically deleted fields exist in 100 fields, if a deleted field bitmap is used to describe a distribution of the logically deleted fields in all the fields, only 100*1 bits need to be consumed; or if a size list and/or a type list are or is used to describe a distribution of the logically deleted fields, 99*2 bits or 99*4 bits need to be consumed. When only one logically deleted field exists in 100 fields, if a size list and/or a type list are or is used to describe a distribution of the logically deleted field, only 1*2 bits or 1*4 bits need to be consumed; or if a logically deleted field bitmap is used to describe a distribution of the logically deleted field in all the fields, 100*1 bits need to be consumed. It can be seen from these two examples that when a proportion of logically deleted fields is too high, it is better to describe a distribution of the logically deleted fields by using a deleted field bitmap; otherwise, it is better to describe a distribution of the logically deleted fields by using a size list and/or a type list.

Case 3 (Invalid Fields Include a Null-Value Field and a Logically Deleted Field)

When there are at least two types of invalid fields, a bitmap in the description part can include one or more bitmaps in a one-to-one correspondence with one or more specific invalid fields. For example, in case 3, the bitmap in the description part can include a null-value field bitmap and/or a deleted field bitmap.

When null-value fields are sufficient to satisfy a second specified condition (which can be the same as the first predetermined condition in case 1), the description part can describe a distribution of the null-value fields in all the fields by using a null-value field bitmap; otherwise, the description part can describe a distribution of the null-value fields by using a size list and/or a type list.

Elements (NULL_BIT) in the null-value field bitmap can be in a one-to-one correspondence with all the fields in the ontology definition data, and the element indicates whether a corresponding field is a null-value field. For example, when NULL_BIT=1, it indicates that a corresponding field is a null-value field, and when NULL_BIT=0, it indicates that a corresponding field is not a null-value field. The second specified condition can include that a proportion of null-value fields in all the fields reaches a second proportion threshold.

When null-value fields are insufficient to satisfy a second specified condition, elements (SIZE and/or TYPE) in the size list and/or the type list can be in a one-to-one correspondence with at least a portion of fields (including valid fields) in the ontology definition data. An element corresponding to a null-value field (if existent) is a predetermined value. For example, referring to FIG. 5, when SIZE=0b1110, it indicates that a corresponding field is a null-value field. For another example, referring to FIG. 5 and FIG. 6, when SIZE=0b1110 and TYPE≠0b11, it indicates that a corresponding field is a null-value field.

In addition, when logically deleted fields are sufficient to satisfy a third specified condition (which can be the same as the first predetermined condition in case 2), the description part can describe a distribution of the logically deleted fields in all the fields by using a deleted field bitmap; otherwise, the description part can describe a distribution of the logically deleted fields by using a size list and/or a type list.

Elements (DEL_BIT) in the deleted field bitmap can be in a one-to-one correspondence with all the fields, and the element indicates whether a corresponding field is a logically deleted field. For example, when DEL_BIT=1, it indicates that a corresponding field is a logically deleted field, and when DEL_BIT=0, it indicates that a corresponding field is not a logically deleted field. The third specified condition can include that a proportion of logically deleted fields in all the fields reaches a third proportion threshold.

When logically deleted fields are insufficient to satisfy a third specified condition, elements (SIZE and/or TYPE) in the size list and/or the type list can be in a one-to-one correspondence with at least a portion of fields (including valid fields) in the ontology definition data. An element corresponding to a logically deleted field (if existent) is a predetermined value. For example, referring to FIG. 6, when TYPE=0b11, it indicates that a corresponding field is a logically deleted field. For another example, referring to FIG. 5 and FIG. 6, when SIZE=0b1111 and TYPE=0b11, it indicates that a corresponding field is a logically deleted field.

For case 3, the following cases are possible: 1. The ontology definition data include a small quantity of logically deleted fields, but there are a relatively large quantity of null-value fields in the instance data. In this case, the encoded data include a null-value field bitmap, and does not include a deleted field bitmap. In addition to elements corresponding to valid fields, the size list or the type list of the encoded data includes elements corresponding to the deleted logical fields. Values of the elements corresponding to the deleted logical fields in the size list or the type list are predetermined values, so that the logically deleted fields are distinguished from the valid fields. 2. There are a relatively small quantity of null-value fields in the instance data, but there are a relatively large quantity of logically deleted fields in the ontology definition data. In this case, the encoded data include a deleted field bitmap, and does not include a null-value field bitmap. In addition to elements corresponding to valid fields, the size list or the type list of the encoded data includes elements corresponding to the null-value fields. Values of the elements corresponding to the null-value fields in the size list or the type list are predetermined values, so that the null-value fields are distinguished from the valid fields. 3. There are a relatively large quantity of null-value fields and logically deleted fields. In this case, the encoded data include a deleted field bitmap and a null-value field bitmap, and the size list or the type list of the encoded data includes only elements corresponding to valid fields.

In view of the above-mentioned cases, in some embodiments, when invalid fields are insufficient to satisfy the first specified condition, an element corresponding to the invalid field in the size list can be (or indicate) 0 or a null value, and in the type list, an element corresponding to the invalid field can be an invalid identifier (for example, 0b11).

In some embodiments, when a value of a valid field is a special value (for example, a zero value), the valid field may not be stored in the data area during encoding. In other words, the data area is only used to store a value of a valid field with a non-special value (for example, a non-zero value). Further, the description part can mark the special value of the valid field by using a size list and/or a type list. For example, referring to FIG. 5 and FIG. 6, when SIZE=0b1111 and TYPE≠0b11, indicates that a value of a corresponding field (valid field) is a zero value. Certainly, in [SIZE_ARR], SIZE corresponding to a valid field whose value is a zero value can alternatively be equal to another predetermined value, for example, 0b1110.

In some embodiments, to reduce storage space as much as possible, for a value of a valid field, the encoding module 1120 can select, as a storage space size of the value of the valid field in the data area, a minimum size of storage space that can store most significant bits of the value from at least two storage space sizes corresponding to corresponding elements in the type list. The at least two storage spaces corresponding to the corresponding elements can be at least storage space sizes corresponding to a certain summary data type. For example, the integer type can specifically include int8, int32, and int64, in other words, the integer type can correspond to 1 byte, 4 bytes, and 8 bytes. By way of example only, when a data type of a valid field is int32, but most significant bits of a value of the valid field can be stored by using 1 byte, SIZE corresponding to the valid field can be set to 0b0000 based on an indication relationship shown in FIG. 5.

In some embodiments, the encoded data can further include a quantity of fields (which can be denoted as [CNT]) and/or an encoding identifier (which can be denoted as [VER]). The quantity of fields can be determined based on a total quantity of the one or more fields. For example, when the one or more fields in the ontology definition data are n fields, the quantity of fields can be equal to n. The encoding identifier can be used to distinguish between different encoding methods (formats), in other words, to indicate a method (for example, case 1 or 3 in case 3) used to obtain the current encoded data through encoding. [CNT] and/or [VER] can be set to have a fixed data size (for example, a fixed quantity of bits or a fixed quantity of bytes). For example, [VER] can occupy 4 bits, and [CNT] can occupy 2 bytes (a maximum of 65,535 fields can be created). By way of example only, referring to the above-mentioned embodiments, encoding formats indicated by different encoding identifiers can be shown in FIG. 7. In FIG. 7, ROW represents encoded data.

It should be understood that in alternative embodiments, it is not necessary to make a selection from the above-mentioned two encoding ideas, but one of the two encoding ideas is selected as a unified encoding format of instance data.

For example, according to idea 1, the encoded data can include a bitmap, where elements in the bitmap are in a one-to-one correspondence with the one or more fields (namely, all the fields in the ontology definition data), the element is used to indicate whether a corresponding field is an invalid field, and further, the bitmap can be a null-value field bitmap, can be a deleted field bitmap, or can include both; a size list, where elements in the size list are in a one-to-one correspondence with valid fields, and the element is used to indicate a size of storage space occupied by a value of a corresponding field in the data area; and a type list, where elements in the type list are in a one-to-one correspondence with the valid fields, and the element is used to indicate a data type of a corresponding field.

For another example, according to idea 2, the encoded data can include a size list, where elements in the size list are in a one-to-one correspondence with the one or more fields, and the element is used to indicate a size of storage space occupied by a value of a corresponding field (valid field) in the data area or indicate that a corresponding field is an invalid field; and a type list, where elements in the type list are in a one-to-one correspondence with the one or more fields, and the element is used to indicate a data type of a corresponding field or indicate that a corresponding field is an invalid field.

FIG. 8 is an example flowchart illustrating a data decoding method, according to some embodiments of this specification. A process 800 can be performed by one or more processors (for example, one or more processors of the database system 220 shown in FIG. 2). Specifically, the process 800 can be performed by a data decoding system 1200, shown in FIG. 12, implemented in the database system 220. As shown in FIG. 8, the process 800 can include the following steps.

Step 810: Read encoded data from a storage area. In some embodiments, step 810 can be performed by a reading module 1210.

The encoded data can be obtained by using the data encoding method described in any one of the embodiments of this specification, and specific details can be found elsewhere in this specification. Details are omitted here for simplicity.

Step 820: Obtain a value of a field to be parsed based on a description part of the encoded data. In some embodiments, step 820 can be performed by a decoding module 1220.

Based on related content of encoding, the decoding module 1220 can determine a status of the field to be parsed based on the description part of the encoded data. For example, when the field to be parsed is a valid field, the decoding module 1220 can determine a location of the value of the field to be parsed in a data area based on a size list, and further, the decoding module 1220 can obtain the value of the field to be parsed from the data area. For another example, the decoding module 1220 can determine that the field to be parsed is an invalid field or the value of the field to be parsed is a special value based on the description part (for example, a bitmap, a size list, or a type list) of the encoded data.

The following describes a data decoding process intuitively by using a specific example.

By way of example only, referring to FIG. 7, the decoding module 1220 can first read [VER] and [CNT], in other words, determine an encoding format satisfied by the encoded data (ROW) and a total quantity (denoted as n) of all fields in ontology definition data. [VER] determines whether the description part of ROW includes [NULL_BIT_MAP] and/or [DEL_BIT_MAP]. [CNT] determines a quantity of elements (DEL_BIT) in [NULL_BIT_MAP]/ [DEL_BIT_MAP]. When ROW does not include [NULL_BIT_MAP] or [DEL_BIT_MAP], a quantity of elements (SIZE) in [SIZE_ARR] is equal to n, and a quantity of elements (TYPE) in [TYPE_ARR] is also equal to n. Referring to FIG. 5 and FIG. 6, when ROW includes [NULL_BIT_MAP] but does not include [DEL_BIT_MAP], a quantity of elements (SIZE) in [SIZE_ARR] is equal to n-j, and a quantity of elements (TYPE) in [TYPE_ARR] is also equal to n-j, where j represents a quantity of elements (NULL_BIT) set to 1 (indicating that a corresponding field is a null-value field) in [NULL_BIT_MAP]. When ROW includes [DEL_BIT_MAP] but does not include [NULL_BIT_MAP], a quantity of elements (SIZE) in [SIZE_ARR] is equal to n-k, and a quantity of elements (TYPE) in [TYPE_ARR] is also equal to n-k, where k represents a quantity of elements (DEL_BIT) set to 1 (indicating that a corresponding field is a logically deleted field) in [DEL_BIT_MAP]. When ROW includes [NULL_BIT_MAP] and includes [DEL_BIT_MAP], a quantity of elements (SIZE) in [SIZE_ARR] is equal to n-j-k, and a quantity of elements (TYPE) in [TYPE_ARR] is also equal to n-j-k. After determining the quantities of elements in [NULL_BIT_MAP], [DEL_BIT_MAP], [SIZE_ARR], and [TYPE_ARR] ([NULL_BIT_MAP] and/or [DEL_BIT_MAP] may not exist), the decoding module 1220 can sequentially read [NULL_BIT_MAP], [DEL_BIT_MAP], [SIZE_ARR], and [TYPE_ARR]. Further, the decoding module 1220 can obtain a value of any field based on [NULL_BIT_MAP], [DEL_BIT_MAP], [SIZE_ARR], and [TYPE_ARR].

Decoding is an inverse process of encoding. Details about determining a value of a valid field, a deleted field, a null-value field, and a valid zero-value field can be determined based on the above-mentioned encoding principle. Details are omitted here for simplicity.

Step 830: Write the value of the field to be parsed to a storage unit. In some embodiments, step 820 can be performed by the decoding module 1220.

In some embodiments, a storage space size of the storage unit can be determined based on a specific data type of the field to be parsed. Referring to the above-mentioned content, when the description part (for example, a type list) of the encoded data describes a summary data type of a field, the decoding module 1220 can select, as a storage space size of a value of the valid field in the data area, a minimum size of storage space that can store most significant bits of a corresponding field value from storage space sizes of at least two specific data types corresponding to corresponding elements in the type list. Therefore, in a decoding phase, the specific data type of the field to be parsed needs to be determined from ontology definition data. In other words, the decoding module 1220 can decode the encoded data based on the ontology definition data. Specifically, the decoding module 1220 can write the value of the field to be parsed to a storage unit of a corresponding size based on the specific data type of the field to be parsed defined by the ontology definition data. For example, a corresponding element in the type list indicates that a data type of the field to be parsed is an integer type, and the value of the field to be parsed may occupy only 1-byte storage space of the data area in the encoded data. However, the specific data type of the field in the ontology definition data is int64 of the integer type. Therefore, the decoding module 1220 writes the value of the field to a storage unit of 8 bytes. When the description part (for example, a type list) of the encoded data describes a specific data type of a field, the specific data type of the field to be parsed can alternatively be determined from the description part.

It can be seen from the above-mentioned embodiments that a user can modify a data table structure or the ontology definition data, which can be specifically logically deleting definitions of some fields or columns in the data table structure or the ontology definition data. Correspondingly, in some embodiments of this specification, a more space-reducing encoding method can be selected based on a quantity of logically deleted fields, to encode instance data. However, when a large quantity of fields in the ontology definition data have been deleted, storage space cannot be effectively reduced even by using the encoding method in the above-mentioned embodiments. For example, 99 of 100 fields have been logically deleted, and a bitmap of 100 bits still needs to be used in the encoded data to describe a distribution of valid fields in the 100 fields. Therefore, some embodiments of this specification propose that new ontology definition data can be generated after most of fields in the ontology definition data are logically deleted, where the new ontology definition data are substantially the same as the old ontology definition data, but only the logically deleted fields in the old ontology definition data are excluded in the new ontology definition data. In some scenarios, a data table needs to be strictly consistent with the ontology definition data. Therefore, after the ontology definition data are updated, encoded data stored in the data table need to be scanned one by one, so that the encoded data are re-encoded based on the new ontology definition data.

FIG. 9 is an example flowchart illustrating an encoded data updating method, according to some embodiments of this specification. A process 900 can be performed by one or more processors (for example, one or more processors of the database system 220 shown in FIG. 2). Specifically, the process 900 can be performed by an encoded data updating system 1300, shown in FIG. 13, implemented in the database system 220. As shown in FIG. 9, the process 900 can include the following steps.

Step 910: Generate new ontology definition data when logically deleted fields in ontology definition data are sufficient to satisfy a fourth specified condition. In some embodiments, step 910 can be performed by a generation module 1310.

The new ontology definition data are obtained by removing the logically deleted fields from the old ontology definition data. Specifically, the generation module X10 can remove information about the logically deleted fields from the old ontology definition data, for example, definitions, data types, and statuses of the logically deleted fields, to obtain the new ontology definition data.

It can be understood that fields in the ontology definition data are fields defined by the ontology definition data, namely, constituent fields of instance data. When there are too many logically deleted fields in the fields defined by the ontology definition data, a large amount of useless information (also referred to as "garbage information") is filled in the ontology definition data and the encoded data, which wastes time in both encoding and decoding, and therefore affects I/O (read/write) performance of the system. Therefore, it is necessary to remove the garbage information (which can be referred to as garbage collection) to ensure I/O performance of the system.

In some embodiments, the fourth specified condition can include that a proportion of the logically deleted fields in all fields reaches a fourth proportion threshold. In some embodiments, the fourth specified condition can include that a proportion of the logically deleted fields in non-null-value fields reaches a fourth proportion threshold.

For stored encoded data, a re-encoding module 1320 can perform step 920 and step 930 to obtain new encoded data and store the new encoded data. The stored encoded data are obtained by encoding the instance data based on the old ontology definition data according to an adaptive encoding method. The adaptive encoding method here is an encoding method that is provided in the above-mentioned embodiments and in which selection is made from the two encoding ideas.

Step 920: Decode the encoded data to obtain decoded data.

For more details about decoding, references can be made to FIG. 8 and related descriptions thereof.

Step 930: Encode the decoded data based on the new ontology definition data to obtain new encoded data and store the new encoded data.

The re-encoding module 1130 can perform step 930 according to the adaptive encoding method.

In some embodiments, the database system 220 can further delete the old ontology definition data. Before deleting the old ontology definition data, when receiving an encoded data read request, for example, when a user needs to query for a value of a specified field in the instance data, the database system 220 can refuse to respond. Before deleting the old ontology definition data, when receiving an instance data write request (for example, a data insertion request or a data update request), the database system 220 encodes the instance data directly based on the new ontology definition data to obtain the new encoded data and store the new encoded data. Deletion here can be logical deletion or physical deletion. The logically deleted old ontology definition data can be physically deleted finally. It can be understood that physically deleting the old ontology definition data helps reduce storage space.

Figure 10:
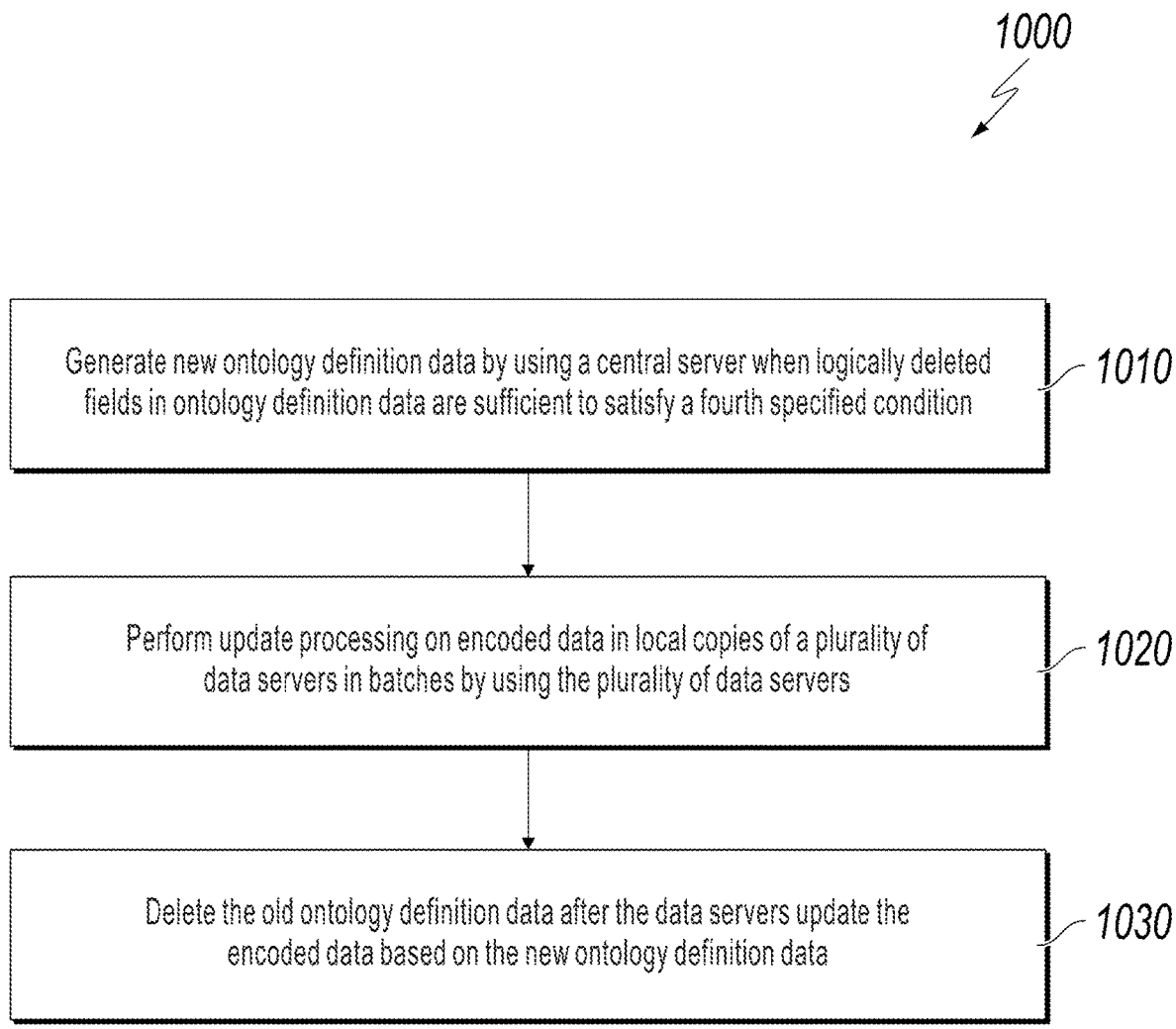
FIG. 10 is an example flowchart illustrating an encoded data updating method, according to some other embodiments of this specification.

FIG. 10 is an example flowchart illustrating an encoded data updating method, according to some other embodiments of this specification. A process 1000 can be performed by the server cluster 300 shown in FIG. 3. As shown in FIG. 9, the process 900 can include the following steps.

Step 1010: Generate new ontology definition data by using a central server when logically deleted fields in ontology definition data are sufficient to satisfy a fourth specified condition.

Referring to FIG. 3 and related descriptions, the central server is responsible for managing the ontology definition data. Therefore, the central server can update the ontology definition data. For implementation details about step 1010, references can be made to the detailed descriptions of step 910.

Step 1020: Perform update processing on encoded data in local copies of a plurality of data servers in batches by using the plurality of data servers.

The encoded data in the local copy are obtained by encoding instance data according to the adaptive encoding method.

By way of example only, update processing can be performed, by using one data server, on encoded data in a local copy of the data server for each batch. After a data server of a current batch completes performing update processing on encoded data, a data server of a next batch can start to perform update processing on encoded data, and so on, until all the data servers complete performing update processing on encoded data.

Performing update processing in batches can ensure that the data server can externally provide a data service (for example, in response to an I/O request from a client).

For more details about step 1020, references can be made to the detailed descriptions of step 920 and step 930. In other words, for each data server, the update processing can include step 920 and step 930.

Step 1030: Delete the old ontology definition data after the data servers update the encoded data based on the new ontology definition data.

The central server and the data servers can delete the old ontology definition data after the data servers update the encoded data based on the new ontology definition data. For more details about deleting the old ontology definition data, references can be made to related content of the process 900.

In some embodiments, different read/write policies can be used for data servers in different update states.

Specifically, for a data server (denoted as S_A) that is updating encoded data based on the new ontology definition data, when receiving an encoded data read request, S_A can refuse to respond. When receiving an instance data write request, $S_A$ can encode instance data based on the new ontology definition data according to the adaptive encoding method, and store encoded data.

For a data server (denoted as S_B) that has not updated encoded data based on the new ontology definition data, when receiving an encoded data read request, S_B can decode the encoded data based on the old ontology definition data. When receiving an instance data write request, S_B can encode instance data based on the new ontology definition data according to the adaptive encoding method, and store encoded data.

For a data server (denoted as S_C) that has updated encoded data based on the new ontology definition data, when receiving an encoded data read request, S_C can decode the encoded data based on the new ontology definition data. When receiving an instance data write request, S_C can encode instance data based on the new ontology definition data according to the adaptive encoding method, and store encoded data.

It is worthwhile to note that the above-mentioned descriptions of the processes are merely for example and description, and do not limit the scope of application of this specification. A person skilled in the art can make various modifications and changes to the processes under the guidance of this specification. However, these modifications and changes still fall within the scope of this specification.

Figure 11:
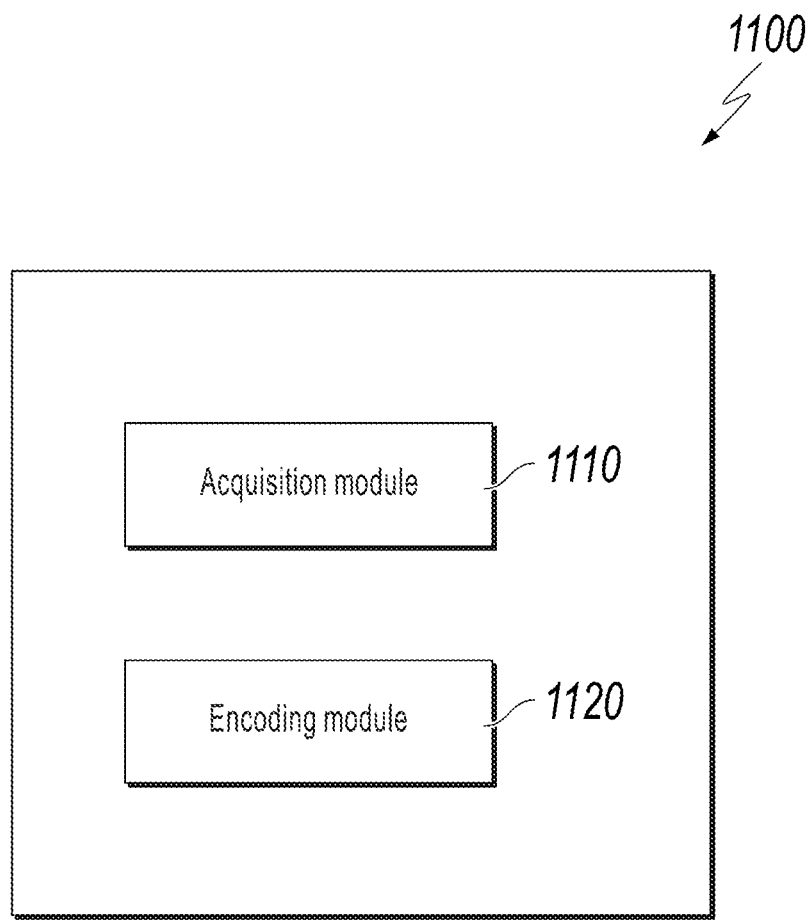
FIG. 11 is an example diagram illustrating modules of an encoding system, according to some embodiments of this specification.

FIG. 11 is an example diagram illustrating modules of an encoding system, according to some embodiments of this specification. A system 1100 can be implemented in the database system 220 shown in FIG. 2.

As shown in FIG. 11, the system 1100 can include an acquisition module 1110 and an encoding module 1120.

The acquisition module 1110 can be configured to obtain instance data.

The encoding module 1120 can be configured to encode the instance data based on ontology definition data to obtain encoded data for storage.

For more details about the system 1100 and the modules thereof, references can be made to FIG. 4 and related descriptions thereof.

Figure 12:
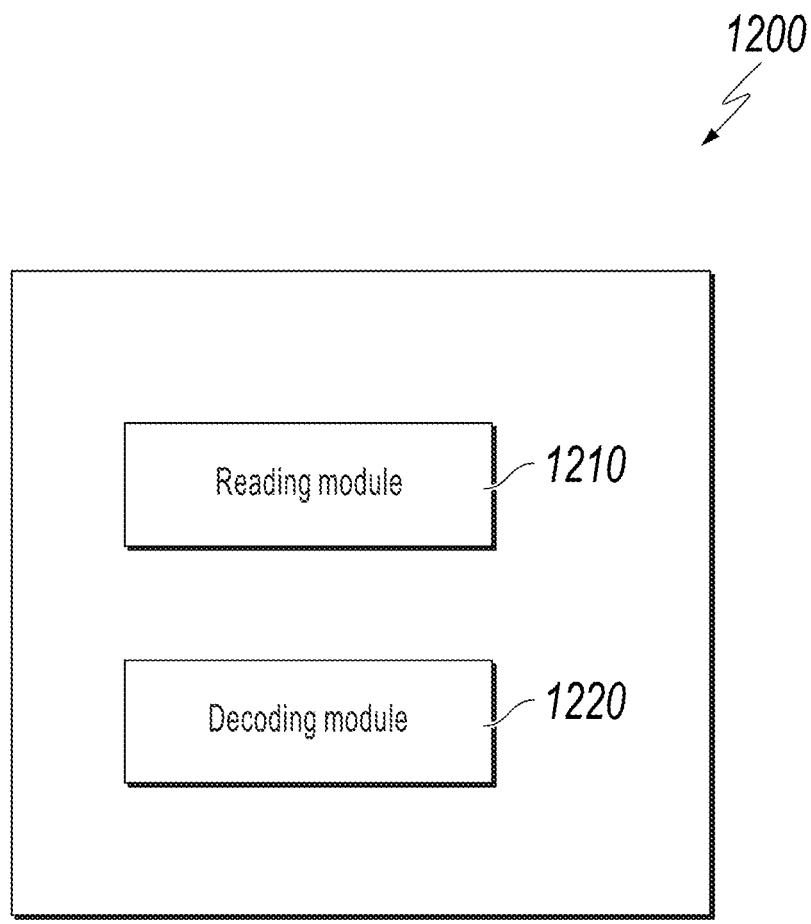
FIG. 12 is an example diagram illustrating modules of a decoding system, according to some embodiments of this specification.

FIG. 12 is an example diagram illustrating modules of a decoding system, according to some embodiments of this specification. A system 1200 can be implemented in the database system 220 shown in FIG. 2.

As shown in FIG. 12, the system 1200 can include a reading module 1210 and a decoding module 1220.

The reading module 1210 can be configured to read encoded data from a storage area. The decoding module 1220 can be configured to decode the encoded data based on ontology definition data, and can be further configured to obtain a value of a field from a data area based on a description part of the encoded data; and write the value to a storage unit, where a storage space size of the storage unit is determined based on a data type of the field in the ontology definition data.

For more details about the system 1200 and the modules thereof, references can be made to FIG. 8 and related descriptions thereof.

Figure 13:
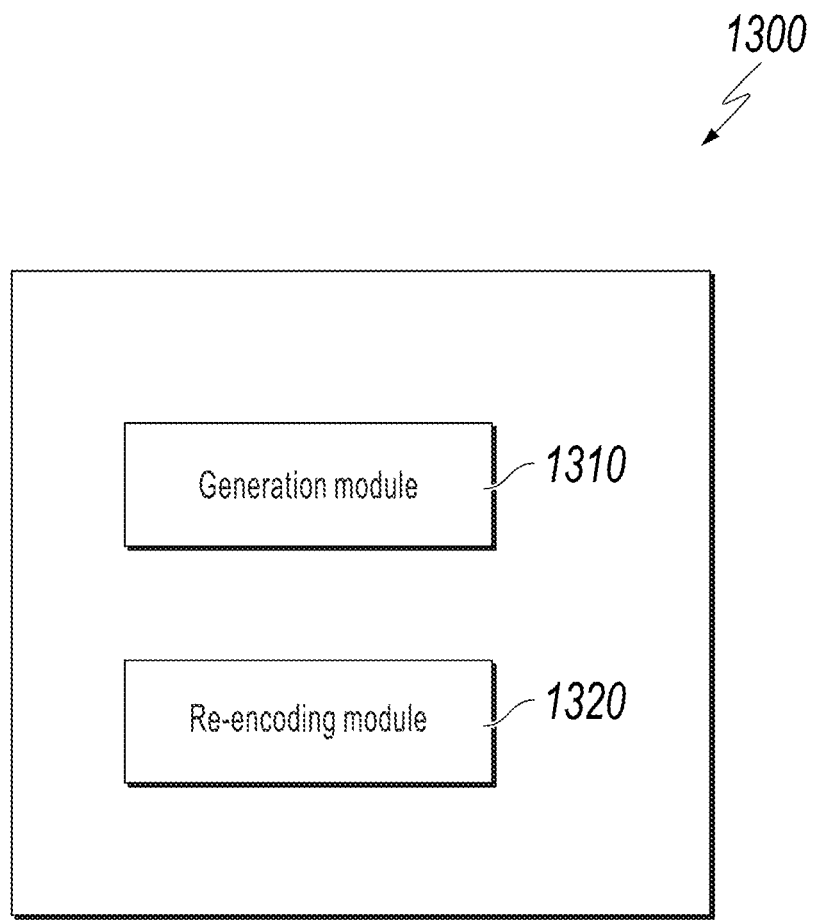
FIG. 13 is an example diagram illustrating modules of an encoded data updating system, according to some embodiments of this specification.

FIG. 13 is an example diagram illustrating modules of an encoded data updating system, according to some embodiments of this specification. A system 1300 can be implemented in the database system 220 shown in FIG. 2.

As shown in FIG. 13, the system 1300 can include a generation module 1310 and a re-encoding module 1320.

The generation module 1310 can be configured to generate new ontology definition data when logically deleted fields in ontology definition data are sufficient to satisfy a fourth specified condition.

The re-encoding module 1320 can be configured to: for stored encoded data, decode the encoded data based on the old ontology definition data, and encode obtained decoded data based on the new ontology definition data to obtain new encoded data and store the new encoded data.

For more details about the system 1300 and the modules thereof, references can be made to FIG. 9 and related descriptions thereof.

It should be understood that the systems shown in FIG. 11 to FIG. 13 and the modules thereof can be implemented in various forms. For example, in some embodiments, the systems and the modules thereof can be implemented by hardware, software, or a combination of software and hardware. The hardware part can be implemented by using dedicated logic. The software part can be stored in a memory and executed by an appropriate instruction execution system, for example, a microprocessor or dedicated design hardware. A person skilled in the art can understand that the above-mentioned methods and systems can be implemented by using computer executable instructions and/or included in processor controlled code. For example, such code is provided on a carrier medium such as a disk, a compact disc (CD), or a digital versatile disk-read only memory (DVD-ROM), a programmable memory such as a read-only memory (firmware), or a data carrier such as an optical or electronic signal carrier. The systems and the modules thereof in this specification can be implemented by a hardware circuit of a semiconductor of a very large-scale integrated circuit or gate array, a logic chip, or a transistor, or a programmable hardware device such as a field programmable gate array or a programmable logic device, or can be implemented by software executed by various types of processors, or can be implemented by a combination (for example, firmware) of the above-mentioned hardware circuit and software.

It is worthwhile to note that the above-mentioned descriptions of the systems and the modules thereof are for ease of description only, and cannot limit this specification within the scope of the embodiments described. It can be understood by a person skilled in the art that, after the principle of the system is understood, the modules can be randomly combined or the modules can constitute a subsystem to be connected to another module without departing from the principle. For example, in some embodiments, the acquisition module 1110 and the encoding module 1120 can be different modules in the system, or can be one module that implements functions of the two modules. Such variations fall within the protection scope of this specification.

Beneficial effects that may be brought by the embodiments of this specification include but are not limited to the following: (1) Only values of valid fields are stored in a data area of encoded data, and invalid columns are marked in a description part of the encoded data, so that storage efficiency of a database can be improved while data content integrity is ensured. Higher storage efficiency also means better I/O performance. (2) Support for null-value fields is added to encoding and decoding of the database, to satisfy more user requirements. (3) An encoding format is adaptively adjusted (in other words, whether a bitmap is enabled to mark invalid fields), so that storage efficiency can be further improved, and I/O performance can be optimized. (4) When a value of a valid field is a special value (for example, a zero value), during encoding, the value may not be stored in the data area, and the special value of the valid field is marked in the description part of the encoded data, so that storage efficiency can be further improved and I/O performance can be optimized while data content integrity is ensured. (5) Garbage collection is performed, so that storage space is further reduced, and I/O performance is optimized. (6) A garbage collection mechanism for a multi-copy architecture is further provided. It is worthwhile to note that beneficial effects that may be generated in different embodiments are different. The beneficial effects that may be generated in different embodiments can be any one or a combination of the above-mentioned beneficial effects, or can be any other beneficial effect that may be achieved.

Basic concepts have been mentioned above. Clearly, for a person skilled in the art, the above-mentioned detailed disclosure is merely an example, but does not constitute a limitation on the embodiments of this specification. Although not expressly stated here, a person skilled in the art may make various modifications, improvements, and amendments to the embodiments of this specification. Such modifications, improvements, and amendments are proposed in the embodiments of this specification. Therefore, such modifications, improvements, and amendments still fall within the spirit and scope of the example embodiments of this specification.

Meanwhile, specific words are used in this specification to describe the embodiments of this specification. For example, terms such as "one embodiment", "an embodiment", and/or "some embodiments" mean that a certain feature, structure, or characteristic is related to at least one embodiment of this specification. Therefore, it is worthwhile to emphasize and note that "one embodiment", "an embodiment", or "an alternative embodiment" mentioned twice or more times in different locations in this specification does not necessarily refer to the same embodiment. In addition, some features, structures, or characteristics in one or more embodiments of this specification can be combined as appropriate.

In addition, a person skilled in the art can understand that aspects of the embodiments of this specification can be described by using several patentable types or cases, including any new and useful combination of processes, machines, products, or substances, or any new and useful improvements to them. Correspondingly, the aspects of the embodiments of this specification can be completely executed by hardware, can be completely executed by software (including firmware, resident software, microcode, etc.), or can be executed by a combination of hardware and software. The above-mentioned hardware or software can be referred to as "data block", "module", "engine", "unit", "component", or "system". In addition, the aspects of the embodiments of this specification can be represented by a computer product located in one or more computer-readable media, and the product includes computer-readable program code.

The computer storage medium may include a propagated data signal that includes computer program code, for example, on a baseband or as part of a carrier. The propagated signal can have a plurality of representations, including an electromagnetic form, an optical form, etc., or a suitable combination form. The computer storage medium can be any computer-readable medium other than a computer-readable storage medium, and the medium can be connected to an instruction execution system, apparatus, or device to implement communication, propagation, or transmission of a program to be used. The program code located on the computer storage medium can be propagated through any suitable medium, including radio, a cable, an optical fiber/cable, radio frequency (RF), or a similar medium, or a combination of any of the above-mentioned media.

Computer program code needed for operations of each part of the embodiments of this specification can be written in any one or more programming languages, including an object-oriented programming language such as Java, Scala, Smalltalk, Eiffel, JADE, Emerald, C++, C #, VB. NET, and Python, a conventional programming language such as C language, Visual Basic, Fortran 2003, Perl, COBOL 2002, PHP, and ABAP, a dynamic programming language such as Python, Ruby, and Groovy, or another programming language. The program code can entirely run on a user computer, or run as a stand-alone package on a user computer, or partially run on a user computer and partially run on a remote computer, or entirely run on a remote computer or processing device. In the latter case, the remote computer can be connected to the user computer in any form of network, such as a local area network (LAN) or a wide area network (WAN), or connected to an external computer (e.g., via the Internet), or in a cloud computing environment, or used as a service, such as software as a service (SaaS).

In addition, unless expressly stated in the claims, the order of the processing elements and sequences, the use of numerals and letters, or the use of other names described in the embodiments of this specification is not intended to limit the order of the processes and methods described in the embodiments of this specification. Although some embodiments of this application that are considered useful currently are discussed by using various examples in the above-mentioned disclosure, it should be understood that such details are for illustrative purposes only, that the appended claims are not limited to the disclosed embodiments, and that the claims are intended to cover all modifications and equivalent combinations that conform to the essence and scope of the embodiments of this specification. For example, although the above-mentioned system components can be implemented by a hardware device, the system components can be implemented only by a software solution, for example, installing the described system on an existing processing device or mobile device.

Similarly, it is worthwhile to note that, to simplify the description disclosed in the embodiments of this specification and help understand one or more embodiments of this application, in the above-mentioned descriptions of the embodiments of this specification, a plurality of features are sometimes incorporated into one embodiment, drawing, or descriptions thereof. However, this disclosure method does not mean that features needed by the object of the embodiments of this specification are more than the features mentioned in the claims. In fact, the features of the embodiments are less than all features of above-mentioned individual embodiments.

Each patent, patent application, and patent application publication and other materials such as articles, books, specifications, publications, or documents are incorporated into this specification here by reference in its entirety, except for the historical application documents that are inconsistent or conflicting with the content of this specification, and the documents (attached to this application currently or later) that limit the widest scope of the claims of this application. It is worthwhile to note that, if the description, definition, and/or use of the terms in the attachments of this specification are or is inconsistent or conflicting with the content of this specification, the description, definition, and/or use of the terms of this specification shall prevail.

Finally, it should be understood that the embodiments described in this specification are merely used to describe the principles of the embodiments of this specification. Other variations may also fall within the scope of the embodiments of this specification. Therefore, by way of example instead of limitation, alternative configurations of the embodiments of this specification can be considered to be consistent with the teachings of this specification. Correspondingly, embodiments of this specification are not limited to the embodiments specifically described in this specification.

The invention claimed is:

1. A computer-implemented method, comprising:
obtaining instance data; and
generating, based on ontology definition data, encoded data corresponding to the instance data, wherein the ontology definition data define a plurality of fields in the instance data and data types of the plurality of fields, wherein the plurality of fields comprise a plurality of valid fields and a plurality of invalid fields, wherein the plurality of invalid fields comprise at least one of a null-value field or a deleted field that is logically deleted in the ontology definition data, and wherein the encoded data comprises:
  a data area for storing value of the plurality of valid fields, the data area comprising a plurality of elements corresponding to the plurality of valid fields and is absent of elements corresponding to the plurality of invalid fields, wherein each of the plurality of elements comprises a value of a corresponding valid field; and
  a description part, configured to:
    when a quantity of the plurality of invalid fields is greater than or equal to a first threshold, describe a distribution of the plurality of valid fields by using validity information of the plurality of fields; and
    when the quantity of the plurality of invalid fields is less than the first threshold, describe the distribution of the plurality of valid fields by using at least one of size information or type information of the plurality of fields,
      wherein the size information comprises a size list, wherein an element in the size list corresponding to a valid field of the instance data indicates a data size occupied by a value corresponding to the valid field, and wherein an element in the size list corresponding to an invalid field of the instance data is set to a first predetermined value; and wherein the type information comprises a type list, wherein an element in the type list corresponding to a valid field of the instance data indicates a data type of the valid field, and wherein an element in the type list corresponding to an invalid field of the instance data is set to a second predetermined value.

2. The method according to claim 1, wherein:

when the quantity of the plurality of invalid fields is less than the first threshold, the description part comprises a size list and a type list, wherein:
  elements of the size list correspond to the plurality of fields, and each of the elements indicates a size of a storage space of a value of a corresponding field in the data area; and
  elements of the type list correspond to the plurality of fields, and each of the elements indicates a data type of the corresponding field; and when the quantity of the plurality of invalid fields is greater than or equal to the first threshold, the description part comprises a bitmap, a size list, and a type list, wherein:
  elements of the bitmap correspond to the plurality of fields, and each of the elements indicates whether a corresponding field is valid;
  elements of the size list correspond to the plurality of valid fields, and each of the elements indicates a size of a storage space of a value of a corresponding valid field in the data area; and
  elements of the type list correspond to the plurality of valid fields, and each of the elements indicates a data type of the corresponding valid field.

3. The method according to claim 1, further comprising:

decoding the encoded data based on the ontology definition data, further comprising:
  obtaining a value of a field from the data area based on the description part of the encoded data; and
  writing the value to a storage unit, wherein a size of storage unit is determined based on the type information of the field in the ontology definition data.

4. The method of claim 1, further comprising:

in response to determining that a quantity of deleted field in the ontology definition data is greater than or equal to a fourth threshold, generating new ontology definition data, wherein the deleted fields are absent in the new ontology definition data;

decoding the encoded data based on the ontology definition data to obtain decoded data; and encoding the decoded data based on the new ontology definition data.

5. The method according to claim 2, wherein:

when a quantity of deleted fields is greater than or equal to a second threshold, the bitmap comprises a first bitmap, elements of the first bitmap correspond to the plurality of fields, and each of the elements indicates whether a corresponding field is logically deleted; and when a quantity of null-value fields is greater than or equal to a third threshold, the bitmap comprises a second bitmap, elements of the second bitmap correspond to the plurality of fields, and each of the elements indicates whether a value of a corresponding field is null.

6. The method according to claim 2, wherein:

when the quantity of the plurality of invalid fields is less than the first threshold, an element of the size list that corresponds to an invalid field is 0 or a null value.

7. The method according to claim 2, wherein an element in the size list that corresponds to a valid field with a zero value is a predetermined value, and wherein the plurality of elements of the data area comprise non-zero values of the valid field.

8. The method according to claim 2, wherein the elements in the type list comprise an integer-type identifier, a character-type identifier, a float-type identifier, and an invalid identifier, and wherein when the quantity of the plurality of invalid fields is greater than or equal to the first threshold, an element of the type list corresponding to an invalid field is the invalid identifier.

9. The method according to claim 8, wherein generating, based on ontology definition data, encoded data corresponding to the instance data comprise:

selecting, from at least two sizes of storage spaces corresponding to the element of the type list that corresponds to a valid field, a smallest size of the at least two sizes that is capable of storing significant bits of the value of the valid field.

10. A non-transitory, computer readable medium storing one or more instructions executable by a computer system to perform operations comprising:

obtaining instance data; and generating, based on ontology definition data, encoded data corresponding to the instance data, wherein the ontology definition data define a plurality of fields in the instance data and data types of the plurality of fields, wherein the plurality of fields comprise a plurality of valid fields and a plurality of invalid fields, wherein the plurality of invalid fields comprise at least one of a null-value field or a deleted field that is logically deleted in the ontology definition data, and wherein the encoded data comprises:
  a data area for storing value of the plurality of valid fields, the data area comprising a plurality of elements corresponding to the plurality of valid fields and is absent of elements corresponding to the plurality of invalid fields, wherein each of the plurality of elements comprises a value of a corresponding valid field; and
  a description part, configured to:
    when a quantity of the plurality of invalid fields is greater than or equal to a first threshold, describe a distribution of the plurality of valid fields by using validity information of the plurality of fields; and
    when the quantity of the plurality of invalid fields is less than the first threshold, describe the distribution of the plurality of valid fields by using at least one of size information or type information of the plurality of fields,
    wherein the size information comprises a size list, wherein an element in the size list corresponding to a valid field of the instance data indicates a data size occupied by a value corresponding to the valid field, and wherein an element in the size list corresponding to an invalid field of the instance data is set to a first predetermined value; and
    wherein the type information comprises a type list, wherein an element in the type list corresponding to a valid field of the instance data indicates a data type of the valid field, and wherein an element in the type list corresponding to an invalid field of the instance data is set to a second predetermined value.

11. The non-transitory, computer readable medium according to claim 10, wherein the bitmap comprises:
a first bitmap, wherein elements of the first bitmap correspond to the plurality of fields, and each element indicates whether a corresponding field is logically deleted; and
a second bitmap, wherein elements of the second bitmap correspond to the plurality of fields, and each element indicates whether a value of a corresponding field is null.

12. The non-transitory, computer readable medium according to claim 10, wherein generating, based on ontology definition data, encoded data corresponding to the instance data comprise:
selecting, from at least two sizes of storage spaces corresponding to the element of the type list that corresponds to a valid field, a smallest size of the at least two sizes that is capable of storing significant bits of the value of the valid field.

13. The non-transitory, computer readable medium according to claim 10, wherein the operations further comprise decoding the encoded data based on the ontology definition data, comprising:
obtaining a value of a field from the data area based on the bitmap, the type list and the size list; and
writing the value to a storage unit, wherein a size of storage unit is determined based on a data type of the field in the ontology definition data.

14. The non-transitory, computer readable medium according to claim 10, wherein the operations further comprise:
in response to determining that a quantity of deleted field in the ontology definition data is greater than or equal to a fourth threshold, generating new ontology definition data, wherein the deleted fields are absent in the new ontology definition data;
decoding the encoded data based on the ontology definition data to obtain decoded data; and
encoding the decoded data based on the new ontology definition data.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining instance data; and
generating, based on ontology definition data, encoded data corresponding to the instance data, wherein the ontology definition data define a plurality of fields in the instance data and data types of the plurality of fields, wherein the plurality of fields comprise a plurality of valid fields and a plurality of invalid fields, wherein the plurality of invalid fields comprise at least one of a null-value field or a deleted field that is logically deleted in the ontology definition data, and wherein the encoded data comprises:
a data area for storing value of the plurality of valid fields, the data area comprising a plurality of elements corresponding to the plurality of valid fields and is absent of elements corresponding to the plurality of invalid fields, wherein each of the plurality of elements comprises a value of a corresponding valid field; and
a description part, configured to:
when a quantity of the plurality of invalid fields is greater than or equal to a first threshold, describe a distribution of the plurality of valid fields by using validity information of the plurality of fields; and
when the quantity of the plurality of invalid fields is less than the first threshold, describe the distribution of the plurality of valid fields by using at least one of size information or type information of the plurality of fields,
wherein the size information comprises a size list, wherein an element in the size list corresponding to a valid field of the instance data indicates a data size occupied by a value corresponding to the valid field, and wherein an element in the size list corresponding to an invalid field of the instance data is set to a first predetermined value; and
wherein the type information comprises a type list, wherein an element in the type list corresponding to a valid field of the instance data indicates a data type of the valid field, and wherein an element in the type list corresponding to an invalid field of the instance data is set to a second predetermined value.

16. The computer-implemented system according to claim 15, wherein an element of the size list that corresponds to an invalid field is 0 or a null value.

17. The computer-implemented system according to claim 15, an element in the size list that corresponds to a valid field with a zero value is a predetermined value, and wherein the plurality of elements of the data area comprise non-zero values of the valid field.

18. The computer-implemented system according to claim 15, wherein the elements in the type list comprise an integer-type identifier, a character-type identifier, a float-type identifier, and an invalid identifier, and wherein an element of the type list corresponding to an invalid field is the invalid identifier.

19. The computer-implemented system according to claim 16, wherein generating, based on ontology definition data, encoded data corresponding to the instance data comprise:
selecting, from at least two sizes of storage spaces corresponding to the element of the type list that corresponds to a valid field, a smallest size of the at least two sizes that is capable of storing significant bits of the value of the valid field.

20. The computer-implemented system according to claim 17, wherein the one or more operations further comprising:
decoding the encoded data based on the ontology definition data, further comprising:
obtaining a value of a field from the data area based on the size list and the type list; and
writing the value to a storage unit, wherein a size of storage unit is determined based on a data type of the field in the ontology definition data.

* * * * *